(12) United States Patent
Komi et al.

(10) Patent No.: US 6,477,185 B1
(45) Date of Patent: Nov. 5, 2002

(54) DEMULTIPLEXING AND DECODING APPARATUS FOR CODED AUDIO AND VIDEO DATA

(75) Inventors: Hironori Komi, Yokohama; Masuo Oku, Kamakura; Takanori Eda, Yokohama; Iwao Ishinabe, Higashiyamato; Tomohisa Ooishi, Urawa; Kazuyuki Takada, Kawaguchi, all of (JP)

(73) Assignees: Hitachi, Ltd., Tokyo (JP); Hitachi ULSI Systems Co., Ltd., Tokyo (JP)

( * ) Notice: Subject to any disclaimer, the term of this patent is extended or adjusted under 35 U.S.C. 154(b) by 0 days.

(21) Appl. No.: 09/162,080

(22) Filed: Sep. 28, 1998

(30) Foreign Application Priority Data

Nov. 17, 1997 (JP) .......................... P09-315439

(51) Int. Cl.[7] .............................. H04J 3/04; H04N 7/04; H04N 7/12
(52) U.S. Cl. ...................... 370/536; 348/472; 348/423.1
(58) Field of Search ................................. 370/535, 536, 370/542, 537, 538, 539, 428, 429; 348/472, 423.1

(56) References Cited

U.S. PATENT DOCUMENTS

| | | | | |
|---|---|---|---|---|
| 4,052,563 A | * | 10/1977 | Noda et al. ................... 179/1 |
| 5,544,161 A | * | 8/1996 | Bigham et al. ............ 370/58.1 |
| 5,768,539 A | * | 6/1998 | Metz et al. ............. 395/200.79 |
| 5,926,647 A | * | 7/1999 | Adams et al. ......... 395/800.36 |
| 6,324,165 B1 | * | 11/2001 | Fan et al. .................... 370/232 |

FOREIGN PATENT DOCUMENTS

| | | |
|---|---|---|
| EP | 7 714 213 A2 | 11/1995 |
| JP | 08275151 | 10/1996 |
| JP | 08265746 | 11/1996 |

* cited by examiner

Primary Examiner—Alpus H. Hsu
Assistant Examiner—Thien D Tran
(74) Attorney, Agent, or Firm—Mattingly, Stanger & Malur, P.C.

(57) ABSTRACT

A demultiplexing and decoding apparatus for coded audio and video data realized with a simple circuit construction and reduced processing load, which processes a packet with higher priority over other packets, prior to the other packets. A plurality of TS packet buffers 73 and 74, for storing input TS packets until they are interpreted, are set in a RAM 7, and processing priority orders are respectively set in the buffers. A PID filter 31 demultiplexes a TS packet, with a PID designated in PID table 36, from a supplied transport stream. A TS packet with higher priority is stored into the TS packet buffer 73, while a TS packet with lower priority is stored into the TS packet buffer 74. Regardless of the input order, the TS packet stored in the TS packet buffer 73 is processed by the CPU 6 prior to the TS packet stored in the TS packet buffer 74.

4 Claims, 13 Drawing Sheets

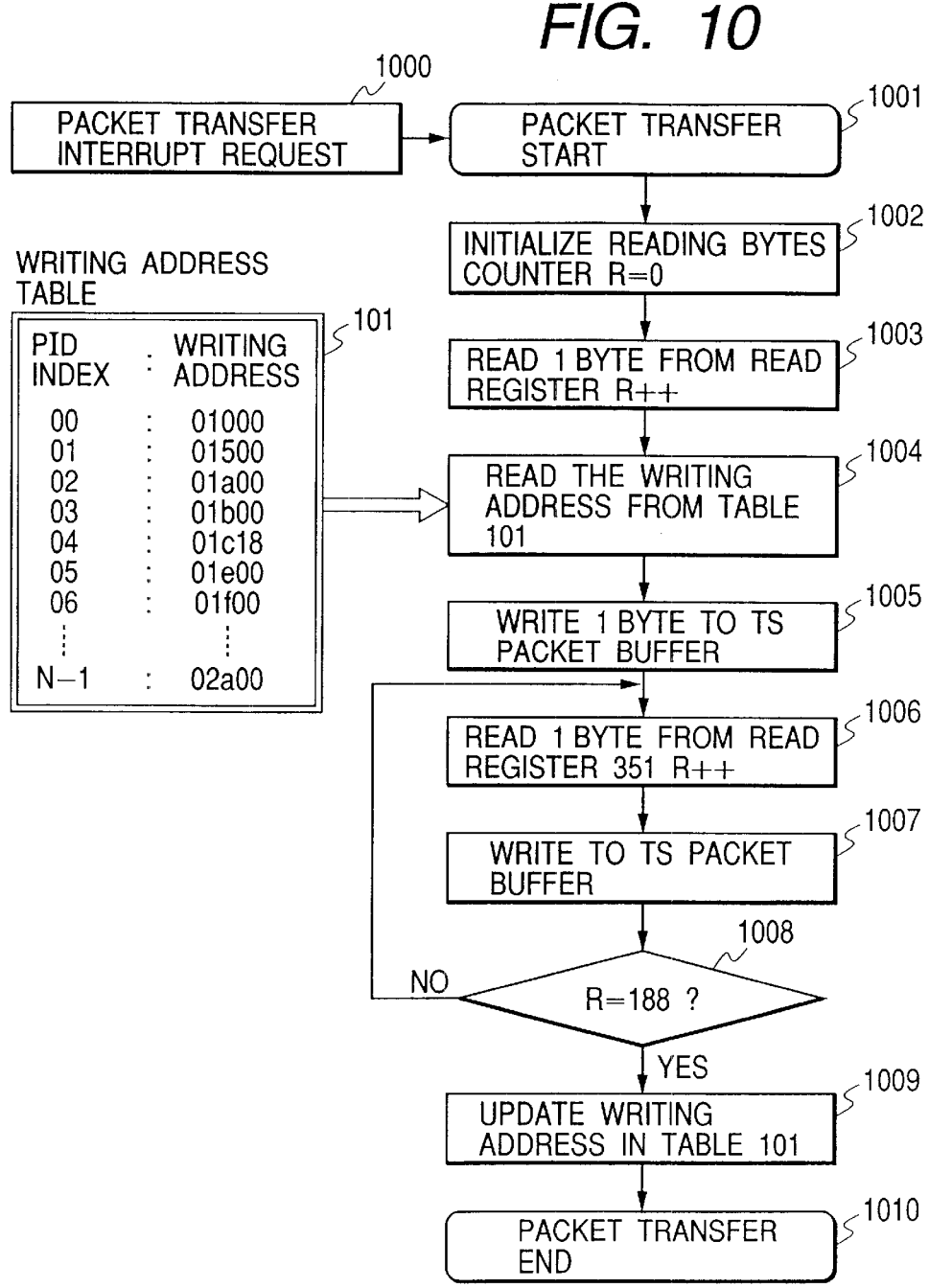

DEMULTIPLEXING AND DECODING APPARATUS FOR CODED AUDIO AND VIDEO DATA

BACKGROUND OF THE INVENTION

The present invention relates to a demultiplexing and decoding apparatus which receives multiplex packet data, formed by compressing and encoding video data and audio data by high-efficiency coding means and packetizing and multiplexing the compressed and coded data, and more particularly, to a demultiplexing and decoding apparatus which demultiplexes the multiplex packet data and decodes necessary code data.

For handling an video signal and an audio signal (hereinafter referred to "A/V data") in digital satellite broadcasting, cable television and the like, a coding method for digital-coding the audio/video signal to reduce spatial and temporal redundancy to reduce the amount of data is widely used. As an example of this high efficiency coding means, a so-called MPEG method standardized by ISO/SC29/WG11 is well known. In the MPEG method, the code data multiplexing is also standardized in the ISO/IEC13818-1: 1994"Information Technology—Coding of Moving Pictures and Associated Audio—Part 1: Systems".

FIG. 11 shows an example of a transport stream (TS) defined in the MPEG system.

In FIG. 11(a), data in the TS is included in a 188-byte fixed-length packet called a TS packet. Upon actual transmission, error-correcting codes are added to the TS packet.

The TS packet has a header which begins from a 1-byte sync word and a 13-bit packet identifier (PID). The subsequent part is called a "payload" including transfer data. Further, an extension header called "adaptation field" is added immediately subsequent to the header, in accordance with necessity. The adaptation field includes program clock reference (PCR) data necessary for reproduction of a system clock and the like.

On the receiving side, the system clock is reproduced by interpreting the PCR data. This realizes a system where the clock frequency is locked with the transmitting side, in which decoding time, output time and buffering speed can be managed in accordance with the assumption by the transmitting side.

The payload includes a program element such as A/V data of a program, as shown in FIG. 11(b), or includes additional information such as PSI (Program Specific Information) data indicative of packet multiplex status and a program table, as shown in FIG. 11(c). The payload of each packet is a data portion of continuous data as shown in FIG. 11(b) or 11(c) (indicated with a broken line in association with FIG. 11(a)).

In a case where the payload is as shown in FIG. 11(b) the stream of the coded program element is packetized (this stream is referred to as a "PES (Packetized Elementary Stream) packet", and the header of the PES packet includes data indicative of the type of program element, data indicative of the PES packet length, and DTS (Decoding Time Stamp) data indicative of time at which the program element is to be decoded, PTS (Presentation Time Stamp) data indicative of time at which the decoded program element is to be presented, and the like.

Further, as the program element, closed caption data to superimpose subtitle information on a decoded video image in accordance with an audience's request, additional A/V data outputted in synchronization with the decoded A/V signal and the like are used as well as the above-described program A/V data. These program elements are outputted in controlled output timing based on the PTS data.

In a case where the payload is as shown in FIG. 11(c), the additional information is divided in section units, and data is formatted for each section. Necessary PSI data and other additional information can be obtained by interpretation in accordance with the format.

The PSI data has a hierarchical table structure, and includes PMT (Program Map Table) data where the correspondence between the element and the PID data is described for each program, PAT (Program Association Table) data where the correspondence between the PMT data and the PID data is described, and the like.

Further, a received TS packet may be encrypted such that a particular audience can decode the data. In this case, descrambling key information and the like are transmitted in section units. Such descrambling information may be ECM (Entitlement Control Message) data including descrambling key information for each program, EMM (Entitlement Management Message) data including individual receiving-machine based descrambling key information, CAT (Conditional Access Table) data indicative of the correspondence between the ECM data and each program, or the like.

Generally, as the additional information, data called electronic program guide (EPG) or the like managed in section units is transmitted. On the receiving machine side, a graphical user interface (GUI) for program selection by a user is constructed or a program reservation system is constructed by visualizing the information and outputting the information to a display screen.

Examples of a system to receive a transport stream (TS), modulated and transmitted via a medium such as CATV or digital satellite broadcasting, and to demultiplex and decode the received TS are disclosed in Japanese Patent Application Laid-Open Nos. 8-275151 and 8-265746.

FIG. 12 is a block diagram showing an example of a conventional demultiplexing and decoding apparatus for coded A/V data. In FIG. 12, reference numeral 1 denotes an input terminal; 2, a demodulator-FEC decoder; 3, a transport demultiplexer; 30, a descrambler; 31, a PID filter; 32, an A/V buffer; 33, a decoder I/F, 34, a PST buffer; 35, a bus I/F; 36, a PID table, 37, an STC (System Time Clock) counter; 4, an audio decoder; 5, a video decoder; 6, a CPU; 7, a RAM; 71, a working area; 72, a TS packet buffer area; 8, a ROM; 9, a system clock generator; 10, a user I/F; 11, an OSD processor; 12 and 13, DAC's (Digital-to-Analog Converters); and 14 and 15, output terminals.

In FIG. 12, a signal tuned to a desired channel by means which is not shown, and received by an antenna or the like, is inputted from the input terminal 1 and supplied to the demodulator-FEC decoder 2. The demodulator-FEC decoder 2 decodes the input signal and performs error correction using the error correction codes in the transport stream, and supplies the signal to the transport demultiplexer 3. In the error-corrected transport stream, a plurality of programs are multiplexed.

In the transport demultiplexer 3, the descrambler 30 appropriately performs descrambling on the supplied transport stream, and supplies the transport stream to the PID filter 31. In the PID filter, a packet including a set of A/V element corresponding to a desired program, desired PSI and an additional information signal are selected and extracted. Upon packet extraction, data within the PID table 36, in which PID's to be selected are set, are sequentially read out, and one PID coincides with the PID of the input TS packet is selected.

Among the input TS packets, a program provided only to a particular audience or the like is encrypted. The descrambler 30 descrambles the encryption. Further, a TS packet including PCR data is transferred from the PID filter 31 to the STC counter 37. The STC counter 37 counts the STC initialized with the PCR by the system clock, and outputs a control signal to the system clock generator 9 such that the difference from the sequentially-arriving PCR data is reduced. The system clock generator 9 generates a system clock as a system control reference clock based on the control signal.

Among the packets demultiplexed by the PID filter 31, a packet including coded A/V data as a desired program element is temporarily stored in the A/V buffer 32, and transferred via the decoder I/F 33 to the audio decoder 4 and the video decoder 5. The audio decoder 4 decodes the supplied coded audio data in accordance with the MPEG method, and outputs the data as a digital audio signal. The video decoder 5 decodes the supplied coded video data in accordance with the MPEG2 method, and outputs the data as a digital video signal. These digital audio signal and digital video signal are respectively converted by the DAC's 12 and 13 into analog audio signal and analog video signal, and supplied from the output terminals 14 and 15 to a speaker (not shown) and a monitor (not shown), and recognized by the audience.

Among the packets demultiplexed by the PID filter 31, a packet including PSI data and additional information is supplied via the PSI buffer 34 and the bus I/F 35 to the RAM 7, and stored into an assigned TS packet buffer area 72. The packet stored in the TS packet buffer area 72 is read by the CPU 6 in the order of arrival, and interpreted in accordance with a program stored in the ROM 8. Further, the information managed in section units is divided in section units in the working area 71 of the RAM 7, and stored as PSI information and EPG information.

For example, when program selection is performed, the CPU 6 forms a display image of a program table, and sends the image via the data bus to the OSD processor 11. The user selects a program while watching the displayed program table by using a remote controller, and information from the remote controller is sent from the user I/F 10 to the CPU 6. The PID of a packet necessary for the selected program is selected based on the PSI information stored in the working area 71. The selected PID is written via the bus I/F 35 into the PID table 36. Then the program designated by the user is demultiplexed by the PID filter 31 and decoded as described above.

In the above conventional apparatus, the TS packet to be processed by the CPU 6 is stored in the TS packet buffer 72. FIG. 13 shows an example of the TS packet buffer 72 having a ring buffer structure for storing M TS packets.

In FIG. 13, the inside of the TS packet buffer is managed by a packet-based address (hereinafter, referred to as a "row address"). The TS packets demultiplexed and extracted by the PID filter 31 (FIG. 12) are written, in the order of arrival, into the row addresses arrayed in accordance with the order of increasing value of the TS packet buffer. Assuming that M row addresses from 0, 1, 2, . . . , (M−1) are set in the TS packet buffer, when the row address is the last address (M−1), TS packets arrive after the writing into the row address (M−1) are sequentially written from the initial address 0. On the other hand, the stored TS packet is read by the CPU 6 (FIG. 12), and subjected to interpretation and processing corresponding to the data. When the interpretation of one packet has been completed, the next TS packet is read from the next row address, and similarly processed by the CPU 6. The order of reading the TS packets from the TS packet buffer is the same as that of writing. Further, in a case where the reading address catches up with the writing address, reading is stopped and interpretation is not performed until a TS packet is newly stored.

In the above conventional apparatus, as the TS packets are processed in the order of arrival, as described above, even though a TS packet to be processed prior to other packets is stored in the TS packet buffer 72, reading from the address where this TS packet is stored cannot be performed until interpretation processing have been performed on all the TS packets which arrived earlier than this TS packet.

For example, subtitle information where the presentation time or the like is designated by the PTS data must be processed prior to the other information such as EPG information. On the other hand, upon program selection or program reservation, for high-speed access to program table data for several days, a large amount of EPG information must be stored in the memory in advance. Accordingly, in this case, a large number of TS packets related to the EPG information are stored into the TS packet buffer 72 at once.

In this case, as shown in FIG. 13, a large number of TS packets having the EPG data are stored from the current reading position (row address) to a position immediately prior to the row address (M−4) where the subtitle information is stored. If the period of interpretation of the respective EPG data is prolonged, the subtitle information cannot be displayed at desired time.

SUMMARY OF THE INVENTION

The present invention has an object to remove the above problem, and to provide a demultiplexing and decoding apparatus for receiving coded audio and video data with a simple circuit construction, which processes a TS packet having higher priority over other packets prior to other packets, regardless of the order of arrival of the packets, thus performs interpretation on additional information and packet multiplexing information without breaking system control.

To attain the above object, the present invention provides a construction comprising: a demultiplexer which selects a packet including one set of compressed bitstream from a multiplexed stream formed by packetizing a plurality of compressed bitstreams, each comprising coded video data and coded audio data, and packet multiplexing information and additional information, and further, selects a packet including a part or all of said packet multiplexing information and said additional information; a video decoder which decodes a video data from the selected compressed bitstream; an audio decoder which decodes audio data from the selected compressed bitstream; a CPU which interprets said selected packet multiplexing information and controls said video decoder, said audio decoder and said demultiplexer; a program memory for storing a program in which a procedure by the CPU is described; a packet buffer for temporarily storing said packet including said selected packet multiplexing information and said additional information until said packet is processed by said CPU; and means for dividing said packet buffer into data segment storage areas, for which priority is set, in accordance with types of data included in said packet, when said packet is stored into said packet buffer memory, and for processing packets stored in said data segment storage areas in accordance with the priority.

Further, the above storage areas are respectively divided for PID's of the packets, and the apparatus further comprises means for determining a TS packet writing address by informing the CPU of an index number of a PID table referred by the demultiplexer upon packet demultiplex selection such that the CPU refers to an address table with the index number.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

FIG. 10 is a flowchart showing the packet transfer processing procedure from reception of the transfer request according to the third embodiment of the demultiplexing and decoding apparatus for coded audio and video data of the present invention;

DETAILED DESCRIPTION OF THE PREFERRED EMBODIMENTS

Preferred embodiments of the present invention will now be described in accordance with the accompanying drawings.

Figure 1:
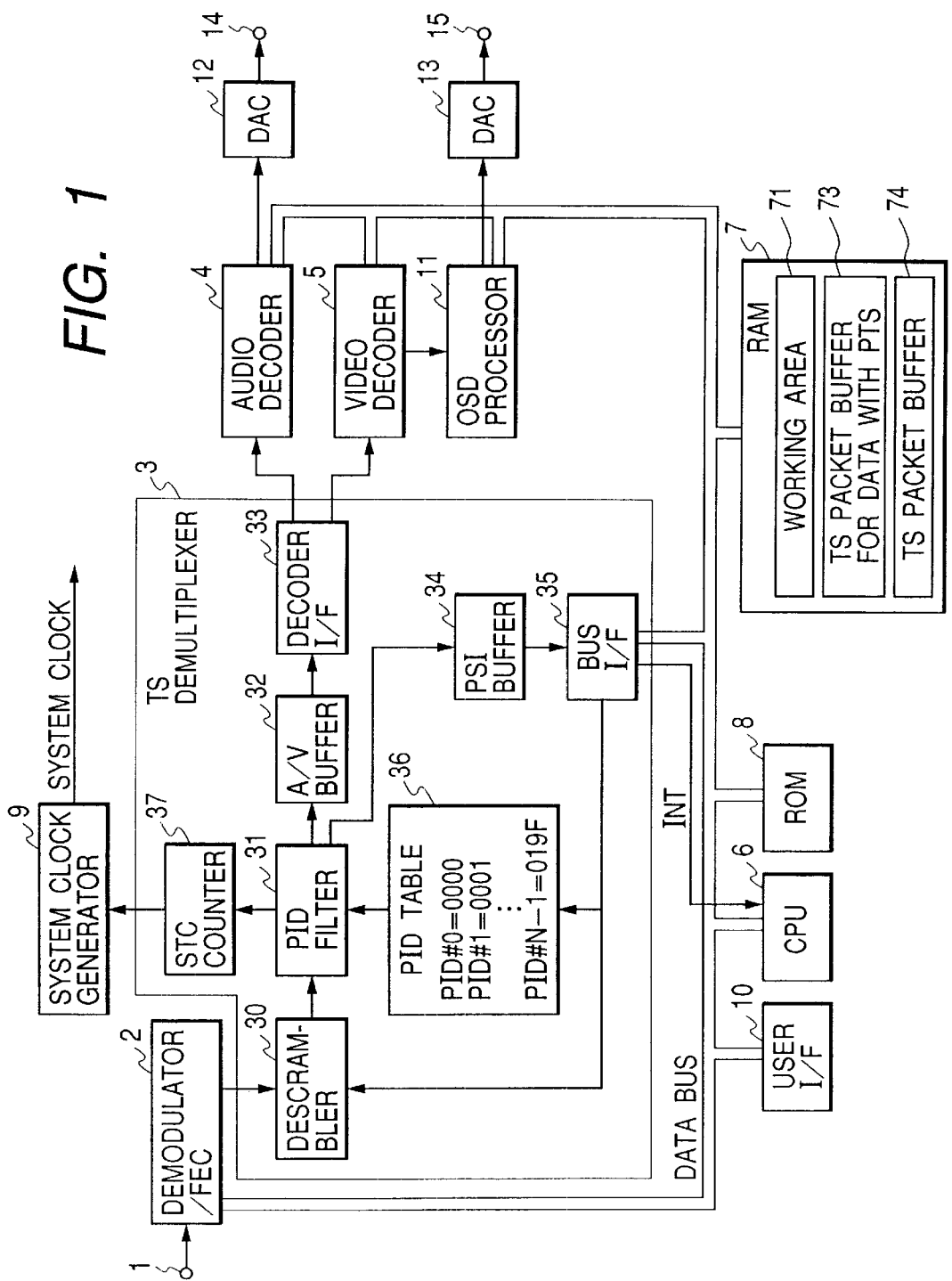
FIG. 1 is a block diagram showing a first embodiment of a demultiplexing and decoding apparatus for coded audio and video data according to the present invention.

FIG. 1 is a block diagram showing a first embodiment of a demultiplexing and decoding apparatus for coded audio and video data according to the present invention. Numeral 73 denotes a TS packet buffer for PTS including data; and 74, a TS packet buffer. In FIG. 1, elements corresponding to those in FIG. 12 have the same reference numerals and explanations of these elements will be omitted.

Figures 11A, 11B, 11C:
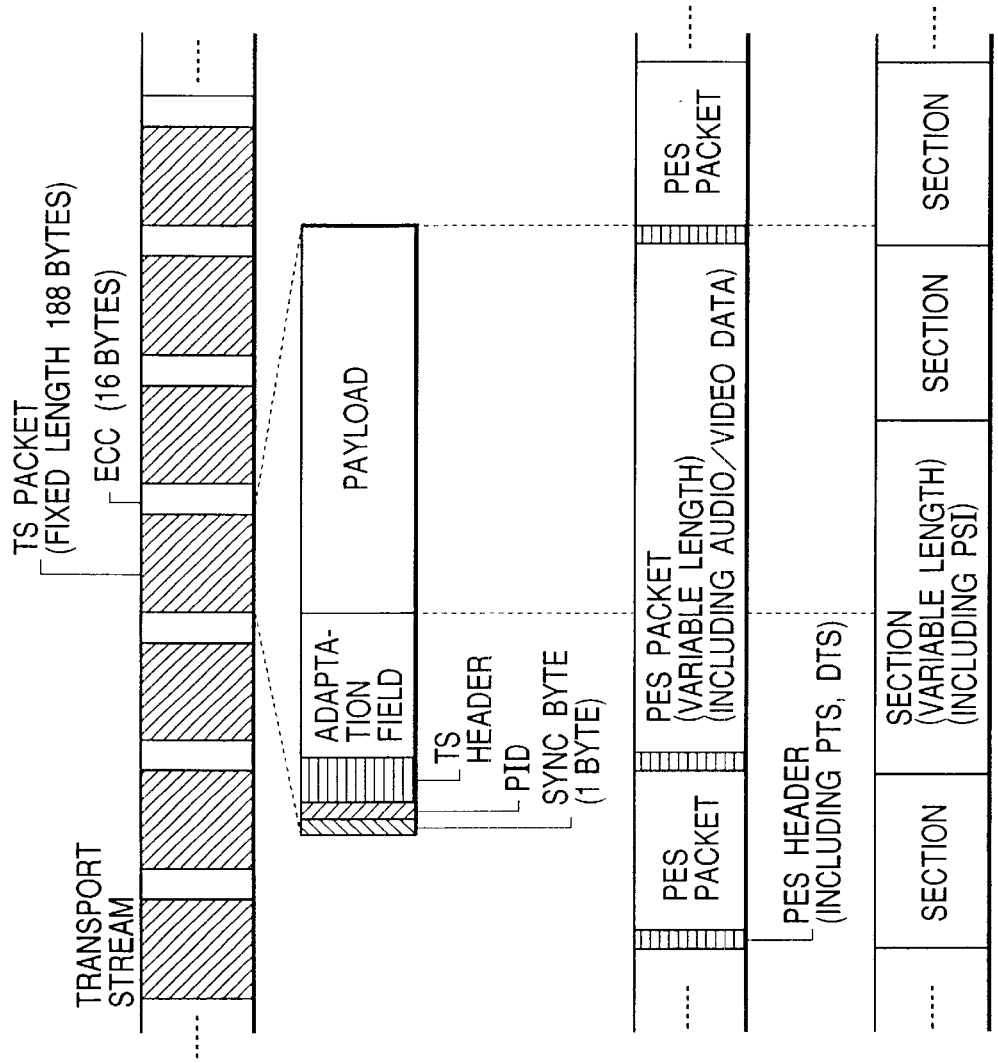
FIGS. 11(a) to 11(c) are schematic views showing an example of the transport stream defined in the MPEG system.

In FIG. 1, a transport stream, error-corrected by the demodulator-FEC detector 2, is supplied to the transport demultiplexer 3. The transport demultiplexer 3 descrambles an encrypted TS packet by the descrambler 30, and supplies the transport stream to the PID filter 31. In this embodiment, the transport stream has a data structure as shown in FIGS. 11(a) to 11(c).

On the other hand, the PID table 36 contains N PID's, and index numbers as storage numbers are allotted to the respective PID storage positions. As described in FIG. 12, when a user selects a desired TS packet such as a program, 3 the CPU 6 designates a PID corresponding to the TS packet in the PID table 36.

Then, the PID filter 31 demultiplexes the TS packet, including an A/V element of the program selected by the user, packet multiplexing information necessary for demultiplexing the TS packet, and additional information from the supplied transport stream, based on the PID designated in the PID table 36.

If the PID of the TS packet in the transport stream supplied to the PID filter 31 coincides the PID of the TS packet including the program element designated in the PID table 36, this TS packet is demultiplexed and transferred to the A/V buffer 32. The A/V buffer 32, comprising an FIFO (First In First Out) memory, is used for transferring data to the decoder I/F 33 in the order of input. Note that the A/V buffer 32 is defined in the MPEG2 system so as to have a 512 byte buffer size for the respective audio data and video data.

The decoder I/F 33 transfers the audio data and video data in the A/V buffer 32 to the audio decoder 4 and the video decoder 5 while performing handshake processing with the decoders. At this time, the parts other than the payloads shown in FIGS. 11(a) to 11(c) are removed from these data, and the data only having a continuity of payloads is supplied as a PES packet to the audio decoder 4 and the video decoder 5. The audio decoder 4 decodes an elementary stream other than the PES header of the PES packet, and outputs the decoded digital audio signal to the DAC 12 at time based on the PTS information in the PES header.

Similarly, the video decoder 5 decodes the elementary stream other than the PES header of the supplied PES packet, and outputs the decoded digital video signal to the OSD processor 11 at time based on the PTS information. The OSD processor 11 mixes OSD data sent from the CPU 6 with the decoded video image, and outputs the mixed signal to the DAC 13. Note that the processing on the OSD data will be described later.

The digital audio signal and digital video signal transferred to the DAC's 12 and 13 are outputted at timings managed based on the PTS data, and constructs the program as a set of A/V signals, and respectively supplied from the output terminals 14 and 15 to the speaker and the monitor.

Next, the demultiplexing processing on the above TS packet including the packet multiplexing information and additional information will be described.

When a PID of a TS packet including packet multiplexing information and additional information is designated in the PID table 36, and a transport stream including a TS packet corresponding to the designated PID is supplied to the PID filter 31, the TS packet is demultiplexed and transferred to the PSI buffer 34. The PSI buffer 34 comprises an FIFO memory, and its buffer size is monitored by the bus I/F 35. If the amount of TS packet storage in the PSI buffer 34 is equal to or greater than a predetermined threshold value, the bus I/F 35 sends an interrupt request for packet transfer to the CPU 6. The CPU 6 receives the interrupt request and enters an interrupt sequence for packet transfer.

Figure 2:
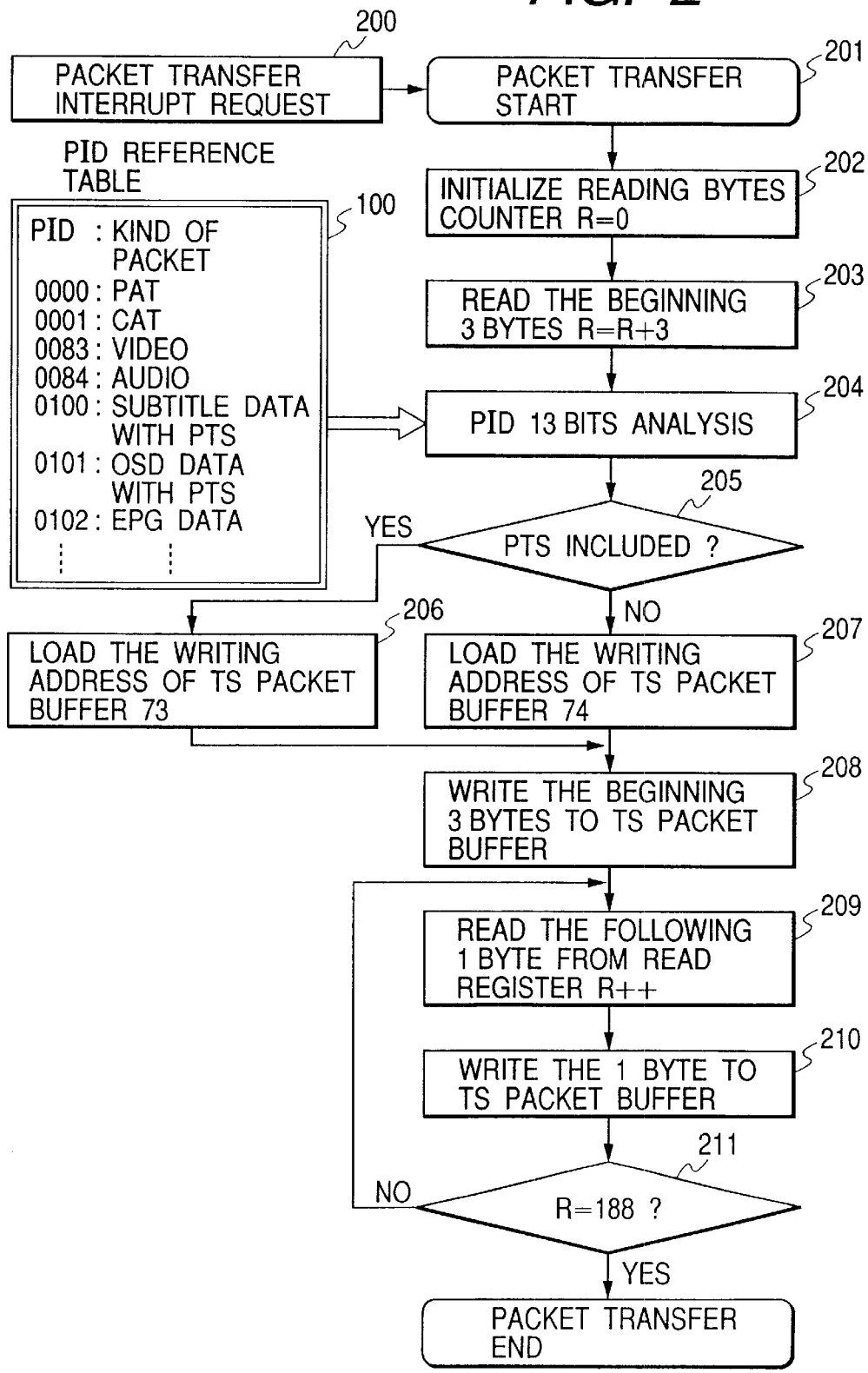
FIG. 2 is a flowchart showing an interrupt sequence procedure by a CPU in FIG. 1.

FIG. 2 is a flowchart showing the procedure of the interrupt sequence. In FIG. 2, when the interrupt request is issued (step 200), the interrupt sequence is started (step 201). First, the number R of read TS packet bytes is initialized to "0" (step 202). Then, to read the PID of the TS header (FIG. 11(a)) of the TS packet, the initial three bytes of the TS packet are read (step 203 (the number R of reading bytes=3 at this time)).

Then, 13 bits of the PID part of the read three bytes is extracted. Note that the CPU 6 has a PID reference table 100, holding information indicative of the correspondence between the contents of the payloads of the TS packets (i.e., the types of the TS packets) and the PID's, in the working area 71 of the RAM 7 (FIG. 1). The PID types are represented by hexadecimal four digits (4 bits×3+1 bit=13 bits). The 13-bit PID transferred from the bus I/F 35 is compared with the contents of the PID reference table 100, and it is determined whether or not the payload of the TS packet includes the PTS including data (step 204).

If the extracted 13 bits of the PID of the TS packet coincide with a PID represented by "0100" or "0101" in the PID management table 100 (i.e., it is the PID of a packet where the content of the payload is "subtitle data with PTS" or "OSD data with PTS") (step 205), the payload of the TS packet has PTS including data. In this case, the TS packet buffer 73 is selected as a storage area for the TS packet in the RAM 7 (FIG. 1), and the current writing address is loaded (step 206). Further, if the 13 bits of the PID part transferred from the bus I/F 35 do not correspond to a TS packet with PTS including data (step 205), the TS packet buffer 74 is selected as a storage area for the TS packet in the RAM 7, and the current writing address is loaded (step 207)

In the TS packet buffers 73 and 74, the 3-byte data read at step 203 is stored from these loaded wiring addresses, and the remaining 185-byte packet data is read via the bus I/F 35 from the PSI buffer 34 sequentially in 1-byte units, and sequentially written following the written 3 bytes (steps 209 and 210). Then, when the 188 bytes are written (step 211 (R=188)), as data for one TS packet has been stored in the RAM 7, the interrupt sequence is completed at this time, and the CPU returns to the initial processing.

Figure 3A:
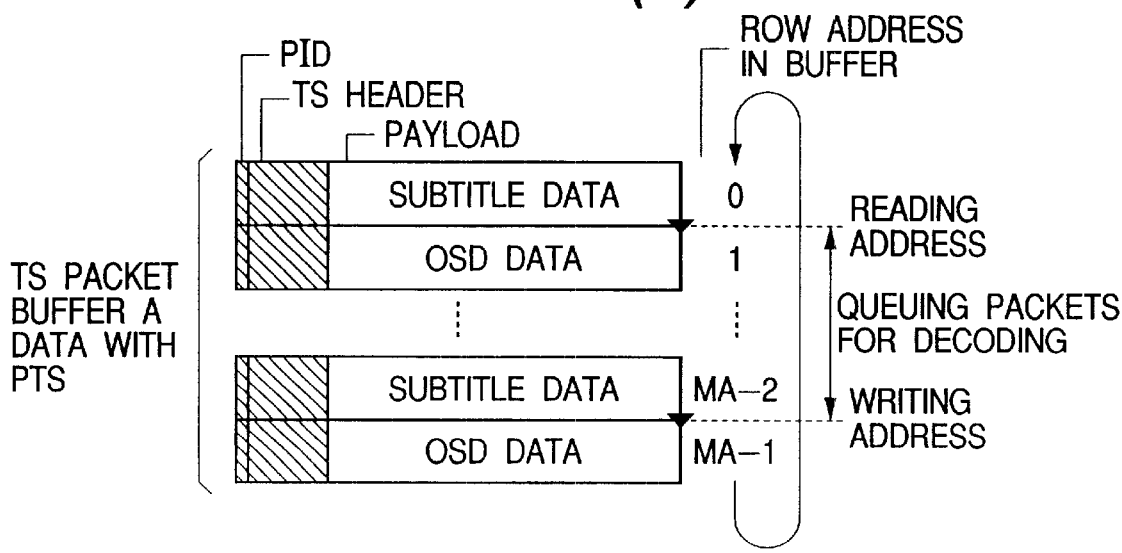
FIGS. 3(a) and 3(b) schematic diagrams showing storage status of TS packets in respective TS packet buffers of a RAM in FIG. 1.
Figure 3B:
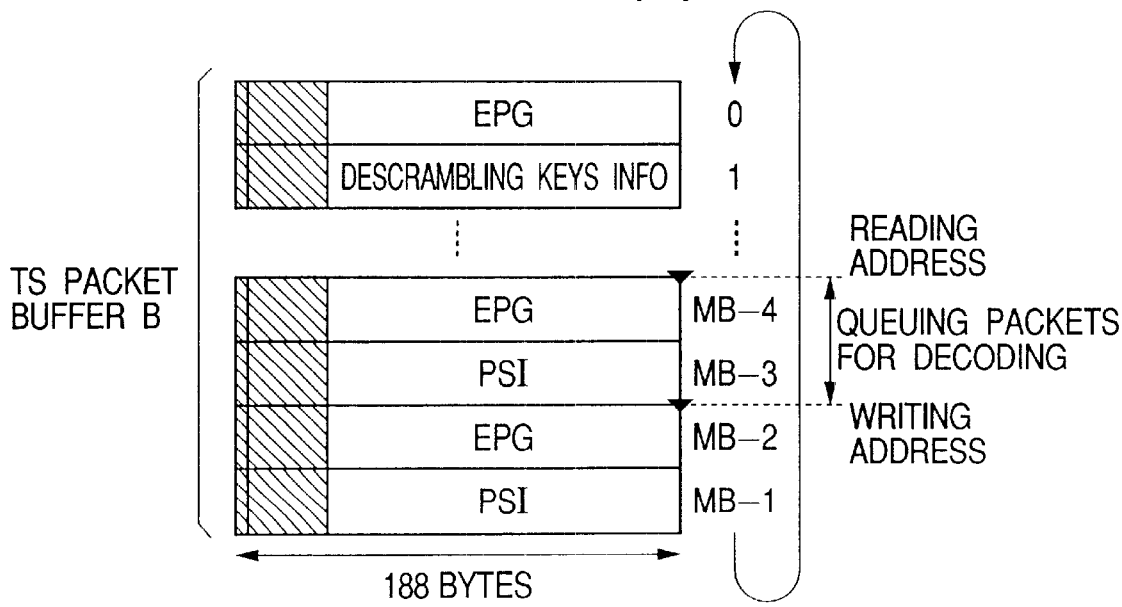

FIG. 3(a) shows the TS packet storage status in the TS packet buffer 73. FIG. 3(b) shows the TS packet storage status in the TS packet buffer 74.

In FIG. 3(a), the TS packet buffer 73 comprises a ring buffer for storing MA TS packets, in which the respective storage positions have addresses 0, 1, 2, . . . , (MA-1). The TS packets stored at storage addresses between the current reading address and writing address are queuing packets for decoding by the CPU 6.

In FIG. 3(b), the TS packet buffer 74 also has a ring buffer for storing MB TS packets, in which the respective storage positions have addresses 0, 1, 2, . . . , (MB-1). The TS packets stored at storage addresses between the current reading address and writing address are queuing packets for interpretation by the CPU 6.

Figure 4:
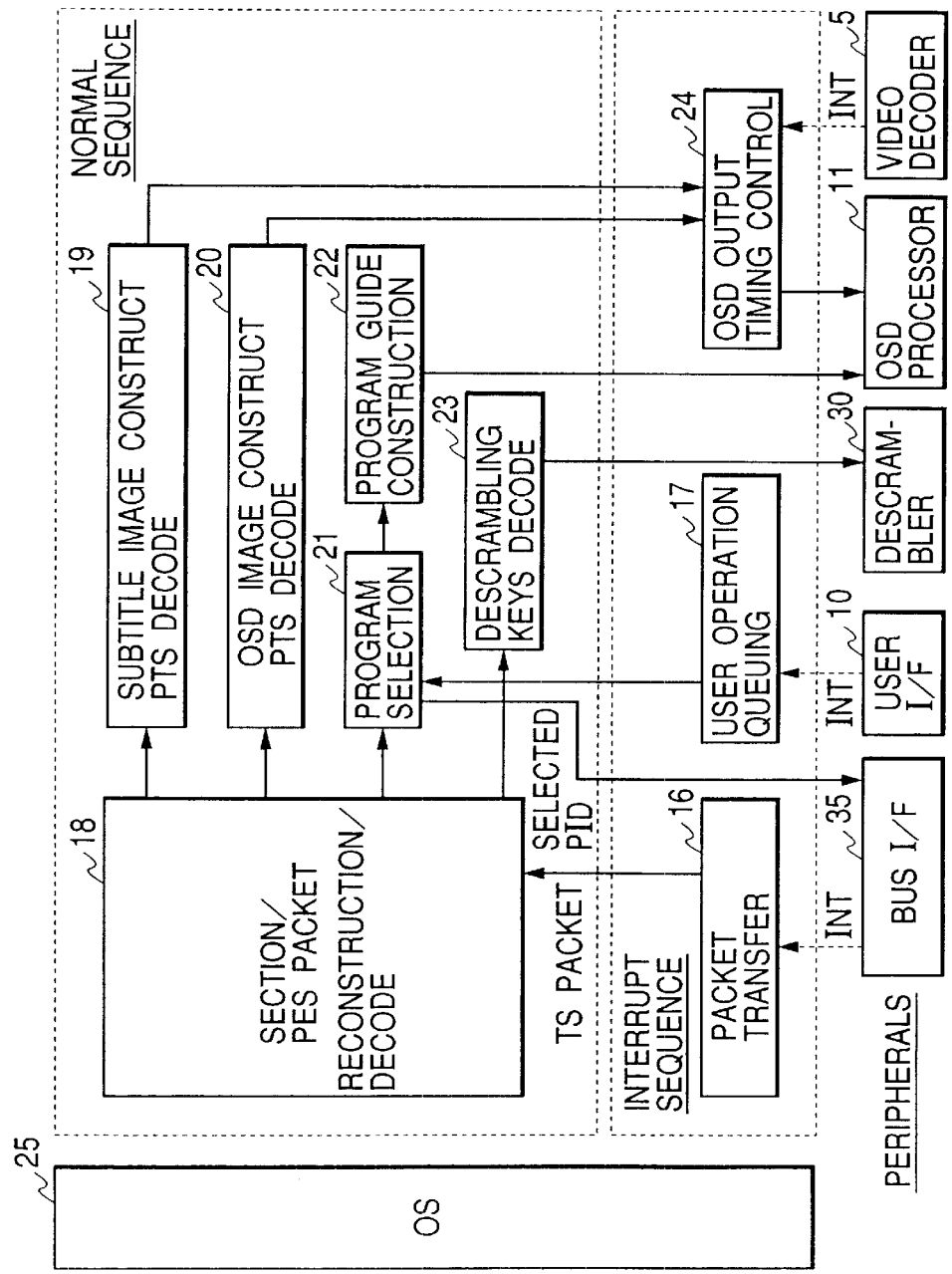
FIG. 4 is a block diagram showing the data flow in processing by the CPU in FIG. 1 for interpreting data in a TS packet stored in the TS packet buffer of the RAM and extracting necessary information for system control or outputting additional information.

The CPU 6 interprets the data in the TS packets stored in the TS packet buffers 73 and 74, and extracts information necessary for system control or outputting additional information. FIG. 4 is a block diagram showing the data flow in the processing by the CPU 6.

In FIG. 4, the processing executed by the CPU 6 is managed in a unit called a "task", and time-divisionally processed by an operating system (OS) 25. The tasks are mainly classified into a normal sequence and an interrupt sequence. If an interrupt request has issued from an external circuit such as the bus I/F 35 in the normal sequence, the interrupt sequence is performed. When the interrupt sequence has been completed, the process returns to a task within the normal sequence at the point before the issuance of the interrupt request.

A packet transferred to the TS packet buffers 73 and 74a by a packet transfer processing 16, as the interrupt sequence, is reconstructed by a section/PES packet reconstruction decode processing 18, as the normal sequence, to the PES packet as shown in FIG. 11(b) or the section structure as shown in FIG. 11(c) before they were TS packetized. The data reconstructed to the PES packet or section structure is temporarily stored in the working area 71 (FIG. 1) of the RAM 7, and utilized by the other tasks. Next, description will be made on processing on data reconstructed by the section/PES packet reconstruction decode processing 18 from a packet in the TS packet buffer 73. Data including closed caption or subtitle information of data reconstructed by the task 18 are reconstructed into a PES packet, and processed by a subtitle image construct PTS decode task 19. Generally, PTS information or the like designates a video frame, for which subtitle information or the like is to be outputted, in the PES packet header or the like, such that such information is outputted as an OSD image in synchronization with a decoded video image. The task 19 interprets the PES packet header including the subtitle information, and manages timing to output the subtitles included in the PES packet to the OSD processor 11. An OSD output timing control processing 24 receives interrupt by each video frame. In a case where the current time is immediately before that of the PTS information of the subtitle information, the OSD output timing control processing 24 outputs the subtitle information formed by the task 19.

The data reconstructed by the task 18 includes OSD data such as the title of a karaoke song, a CG (Computer Graphics) image to be outputted in synchronization with a decoded video image. Regarding these data, the image is processed and managed by an OSD image construct PTS decoding task 20. The OSD output timing control processing 24 monitors the PTS data, and when video frame interrupt has occurred, outputs the data to the OSD processor 11 if immediately before combining timing.

Next, processing on the data reconstructed by the task 18 from a TS packet in the TS packet buffer 74 will be described.

If the user selects a program, data including EPG information among the section data reconstructed by the task 18 is processed by a user operation queuing task 17 for key-operation interpretation and queuing storage. The task 17 is performed by interrupt from the user I/F 10 in accordance with operation from the remote-controller or the like, and the user's key operation or the like is interpreted. Key-operation information is sent to the task 17, and the task 17 select necessary EPG information based on the key-operation information. The selected EPG information is processed by a program selection task 21 as an image display recognizable for the user, and outputted as an image indicating a program table or the like by the OSD processor 11.

Data which has been reconstructed by the task 18 and which includes PSI information is also processed by the task 17. A PID of A/V packet of a program selected by the user is determined by interpretation of PAT, PMT and the like in the PSI information by the task 17. The PID of a packet to be newly selected is transferred to the PID table 36 (FIG. 1) in the transport demultiplexer 3, and subjected to demultiplexing/decoding.

A descrambling keys decoding task 23 obtains key information related to the program from data which has been reconstructed by the task 18 and which includes information to descramble a scramble key. The key information is sent to the descrambler 30 in the transport demultiplexer 3, and used for descrambling.

As described above, among the section data or PES packet reconstructed by the task 18, as PTS including information is outputted as an OSD image at predetermined timing, the interpretation and output data processing must be completed before that timing. On the other hand, regarding the EPG data or the like necessary for the program selection task 21, even if the interpretation of a necessary section has not been completed when the user's key operation is made, the section can be constructed while causing the user to wait. In this manner, the processing does not fail.

Accordingly, in the first embodiment, the section/PES packet reconstruction/decode task 18 processes PTS including data prior to other data. That is, in the RAM 7, the PTS including data is stored in a TS packet buffer 73 as shown in FIG. 3(a), different from the TS packet buffer 74 for the other types of TS packets. The storage amounts in these TS packet buffers 73 and 74 are independently managed. When the storage amounts in the TS packet buffers 73 and 74 become equal to or greater than predetermined threshold values, the TS packets are processed by the task 18. As the threshold value of the TS packet buffer 73 is less than that of the TS packet buffer 74, the TS packet in the TS packet buffer 73 can be processed prior to the TS packet in the TS packet buffer 74.

For example, the threshold value of the TS packet buffer 73 is set to 1 TS. When the storage amount becomes 1 TS packet, interpretation is performed on the content of the TS packet buffer 73.

Figure 5A:
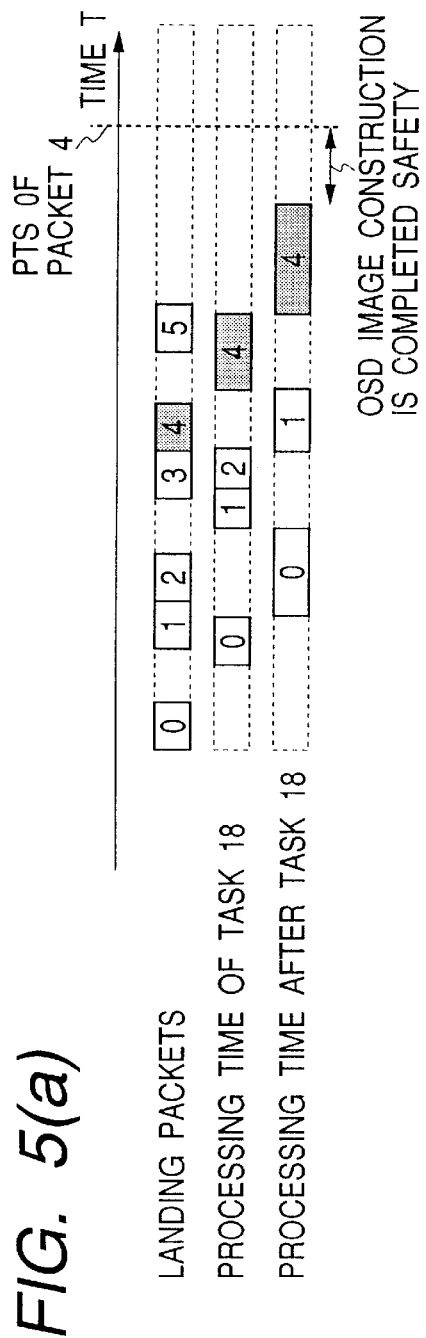
FIGS. 5(a) and 5(b) are explanatory views showing specific TS packet processing prior to other packets in the first embodiment in FIG. 1 constructed with the conventional TS packet processing.

As shown in FIG. 5(a), when six TS packets are sequentially inputted as packets 0, 1, . . . , 5, and sequentially stored in the TS packet buffers 73 and 74, if the fifth packet 4 is PTS including OSD data and other packets 0 to 3 are data other than the OSD data, the packets 0 to 3 are stored into the TS packet buffer 74, and the packet 4 is stored into the TS packet buffer 73.

In this case, when the packet 4 is stored into the TS packet buffer 73, as the storage amount equals the threshold value "1" of the TS packet buffer 73, the interpretation processing by the task 18 is performed on the packet 4 prior to the previously arrived packet 3.

That is, in FIG. 5(a), if the processing by the task 18 is performed on the packet 2 when the packet 4 arrives and is stored into the TS packet buffer 73, as the storage amount of the TS packet buffer 73 equals the threshold value "1", the processing by the task 18 is stopped upon the completion of the processing on the packet 2. The processing by the task 18 is not performed on the next packet 3. Then, when the packet 4 has been stored into the TS packet buffer 73, as the storage amount of the TS packet buffer 73 is equal to the threshold value "1", the packet 4 is read out from the TS packet buffer 73, and the processing by the task 18 is performed on the packet 4. When the processing on the packet 4 has been completed, the packet 3 is read out from the TS packet buffer 74, and the processing by the task 18 is performed on the packet 3.

The subsequent processing to the task 18 are similarly performed. When the processing by the task 18 on the packet 4 is performed, the subsequent processing, performed on another preceding packet at that time, is performed on the packet 4 after the other preceding packet has been processed. FIG. 5(a) shows that the execution of the subsequent processing to the processing by the task 18 on the packet 4, prior to the packet 2.

In this manner, in the first embodiment, desired OSD data can be processed prior to the PTS data designated in the packet 4.

Figure 5B:
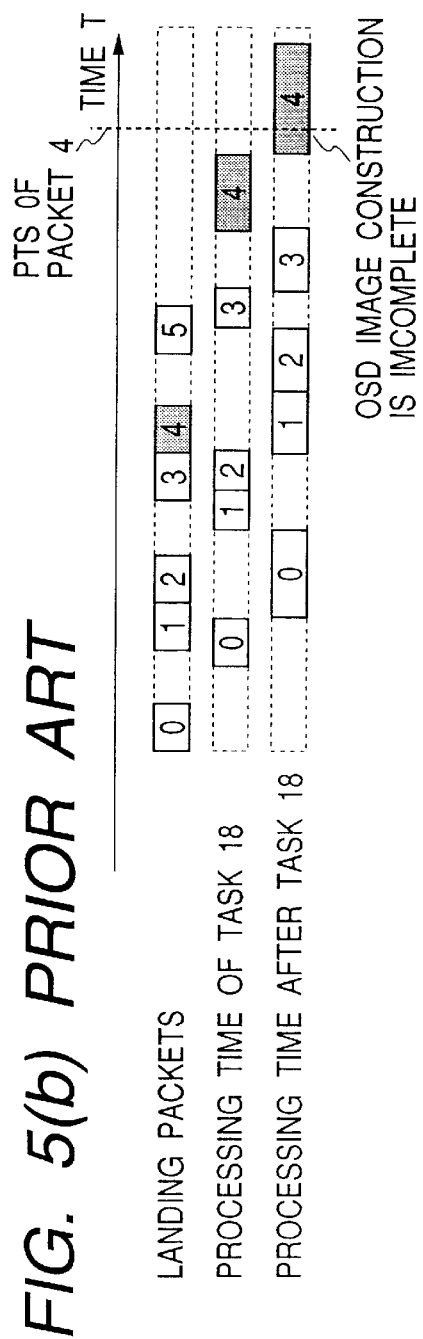
Figure 12:
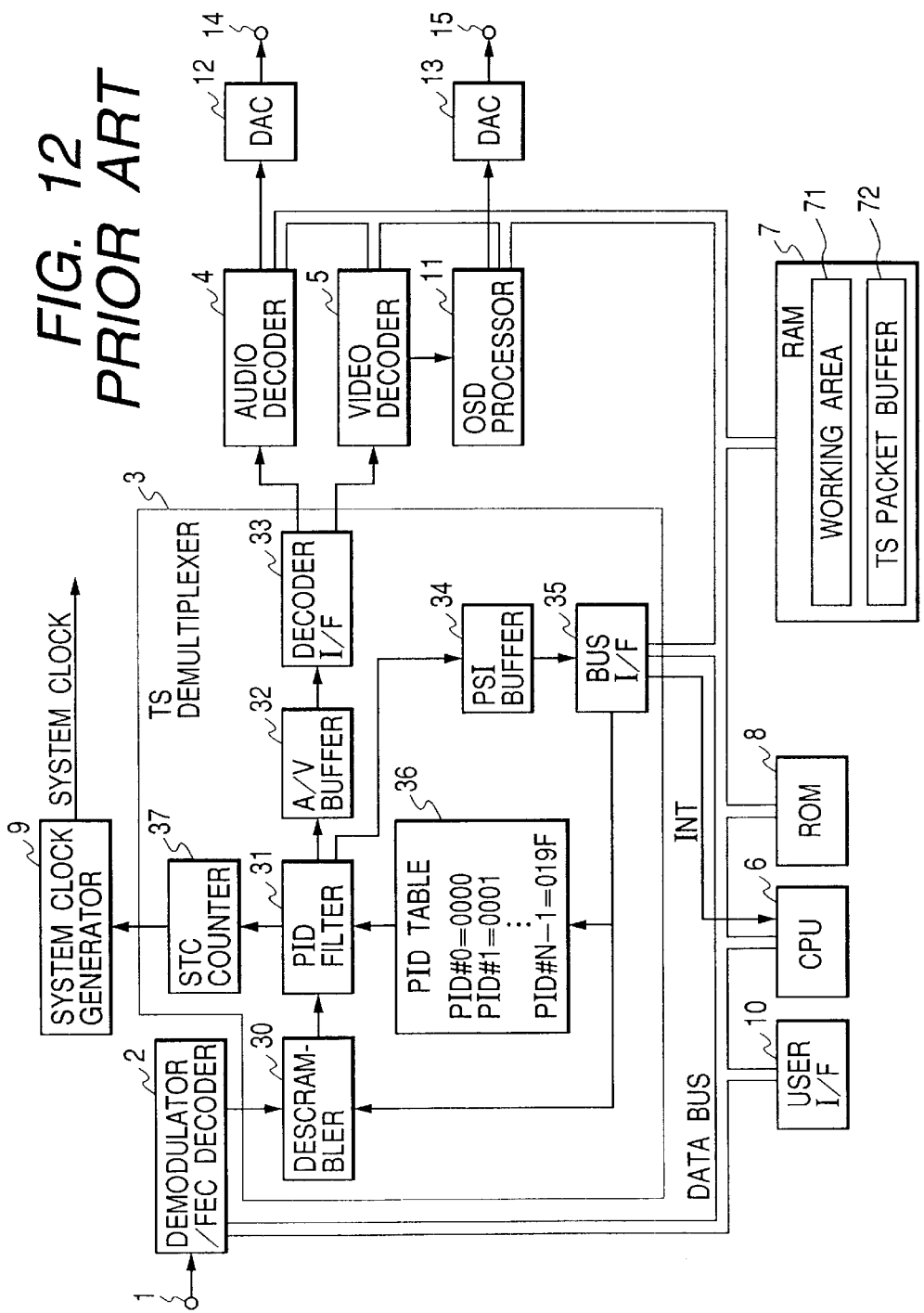
FIG. 12 is a block diagram showing the demultiplexing and decoding apparatus for coded audio and video data.
Figure 13:
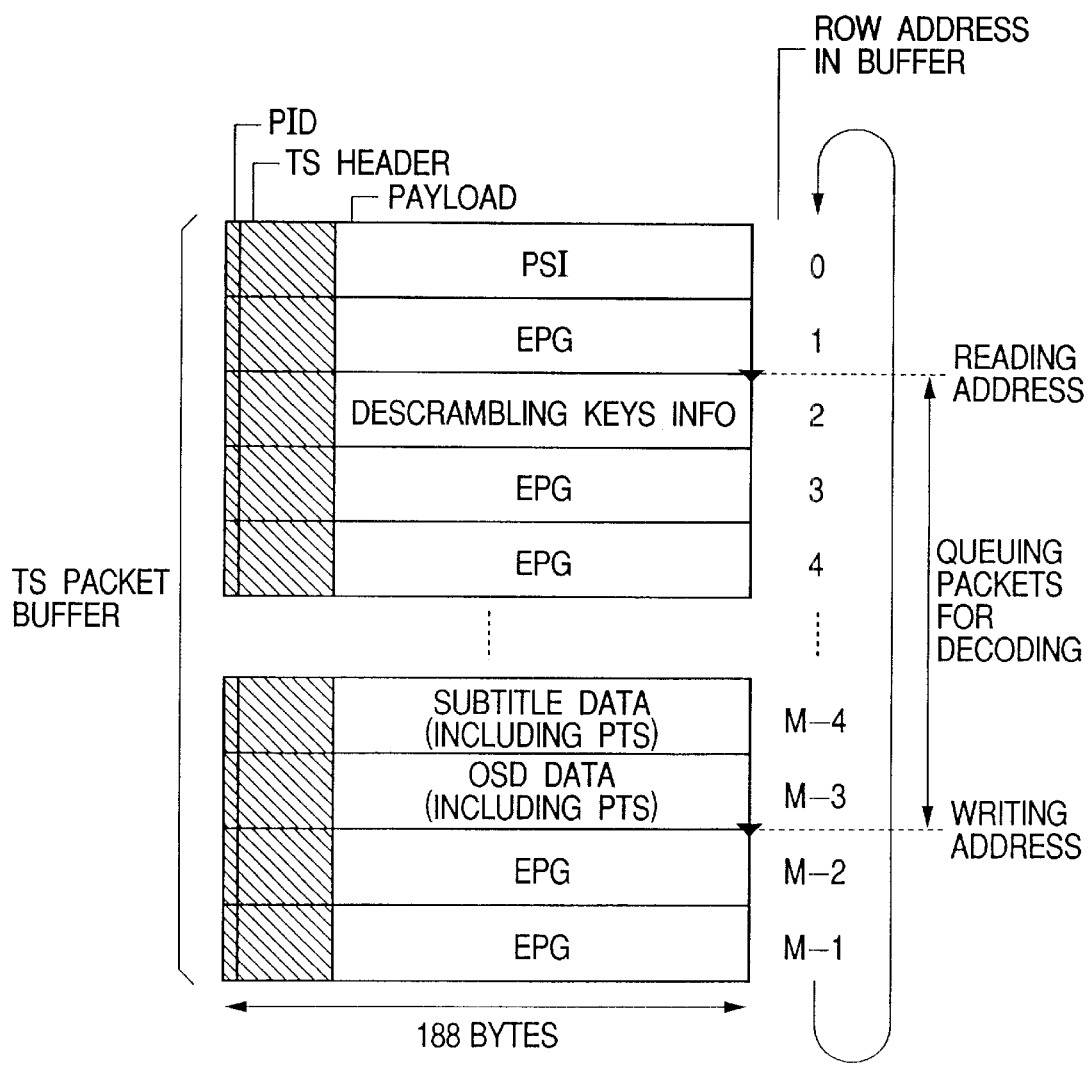
FIG. 13 is a schematic view showing an example of the TS packet buffer in FIG. 12.

On the other hand, FIG. 5(b) shows the conventional technique. In this case, as the RAM 7 has a buffer structure as shown in FIG. 12, the respective processings are performed on the packets in the order of arrival. As described in FIG. 2, the packets are read in the order of packets 0, 1, 2, 3 and 4. Further, the arrival of PTS including OSD data cannot be recognized until PID's are extracted and compared with a PID management table 100, and the packet 5 is finally processed. By this technique, if the period from the storage of the packet 4 to the designated PTS information is short, the OSD data cannot be processed.

As described above, according to the first embodiment, in comparison with the conventional TS packet buffer structure in the conventional RAM 7, it is possible to easily determine the processing priority order based on data type, and avoid failure of processing.

Note that in the first embodiment, the PTS including data is processed prior to any other data, however, this arrangement is effectively applicable to a case of processing on another type of packet data or a case where processing order for each data is further finely divided.

Figure 6:
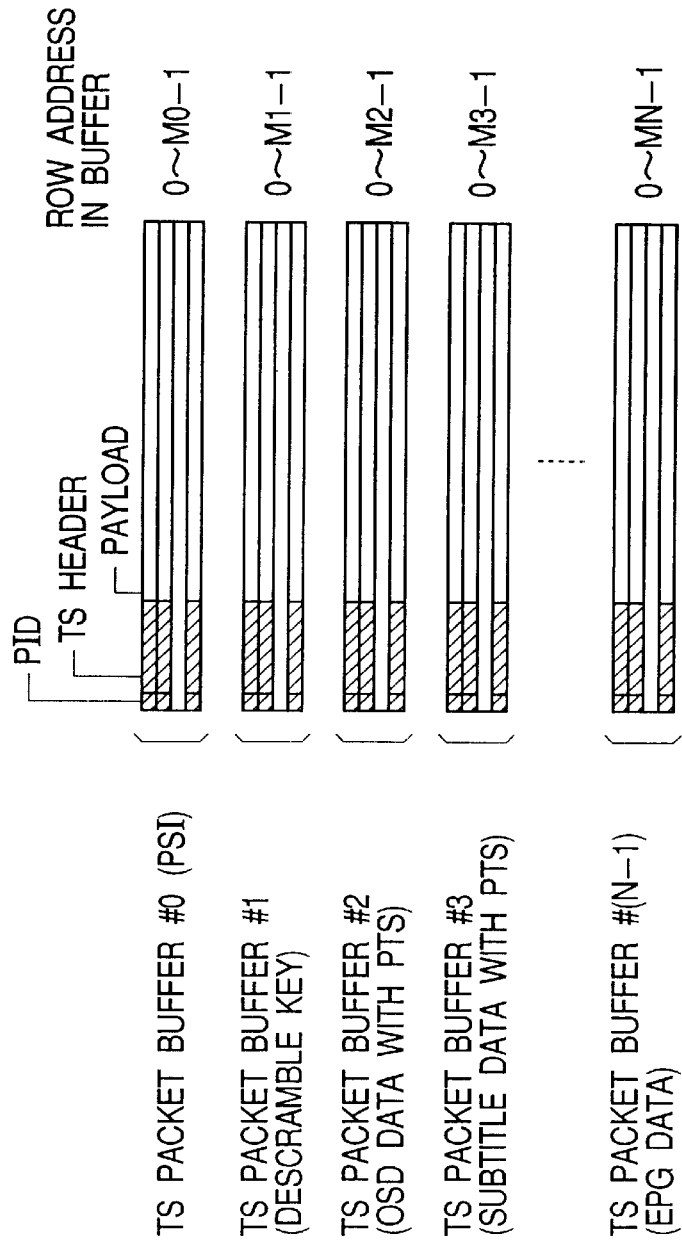
FIG. 6 is a schematic diagram showing the structure of the TS packet buffer according to a second embodiment of the demultiplexing and decoding for coded audio and video data of the present invention.

FIG. 6 is a schematic diagram showing the structure of the TS packet buffer in a second embodiment of the demultiplexing and decoding apparatus for coded audio and video data of the present invention.

The second embodiment have the constituents identical to those in the first embodiment as shown in FIG. 1 except that the TS packet buffer in the RAM 7 has a different structure. Accordingly, in the second embodiment, operation similar to that of the first embodiment is performed, to store a TS packet including packet multiplexing information and additional information demultiplexed by the transport demultiplexer 3 into the TS packet buffer in the RAM 7. However, in the second embodiment, the TS packet buffer memory is divided into storage areas corresponding to the number N of PID's filtered and transferred to the CPU, among PID's set in the PID table 36. The prior order of processing is determined for each of the storage areas.

That is, in FIG. 6, the TS packet buffer is divided into N storage areas, and n-th (n=0, 1, 2, . . . , N−1) storage area is a TS packet buffer #n. The respective TS packet buffers #n operate as ring buffers for storing Mn TS packets. Further, a processing priority order is set for the TS packet buffers #n. TS packets stored in the TS packet buffers #n are processed in the processing priority order, by the CPU 6. Normally, in a transport stream according to the MPEG system standards, the same PID for common data is added to TS packets. Accordingly, processing control based on data type can be made by dividing the TS packet buffer into a plurality of storage areas for the PID's and setting processing priority order for the storage areas.

The index numbers n of the TS packet buffers #n correspond to the index numbers allotted to the PID's stored in the PID table 36 in the transport demultiplexer 3. In the transport demultiplexer 3, when a TS packet extracted by the PID filter 31 is transferred to the CPU 6, its index number is also sent to the CPU 6.

Figure 7:
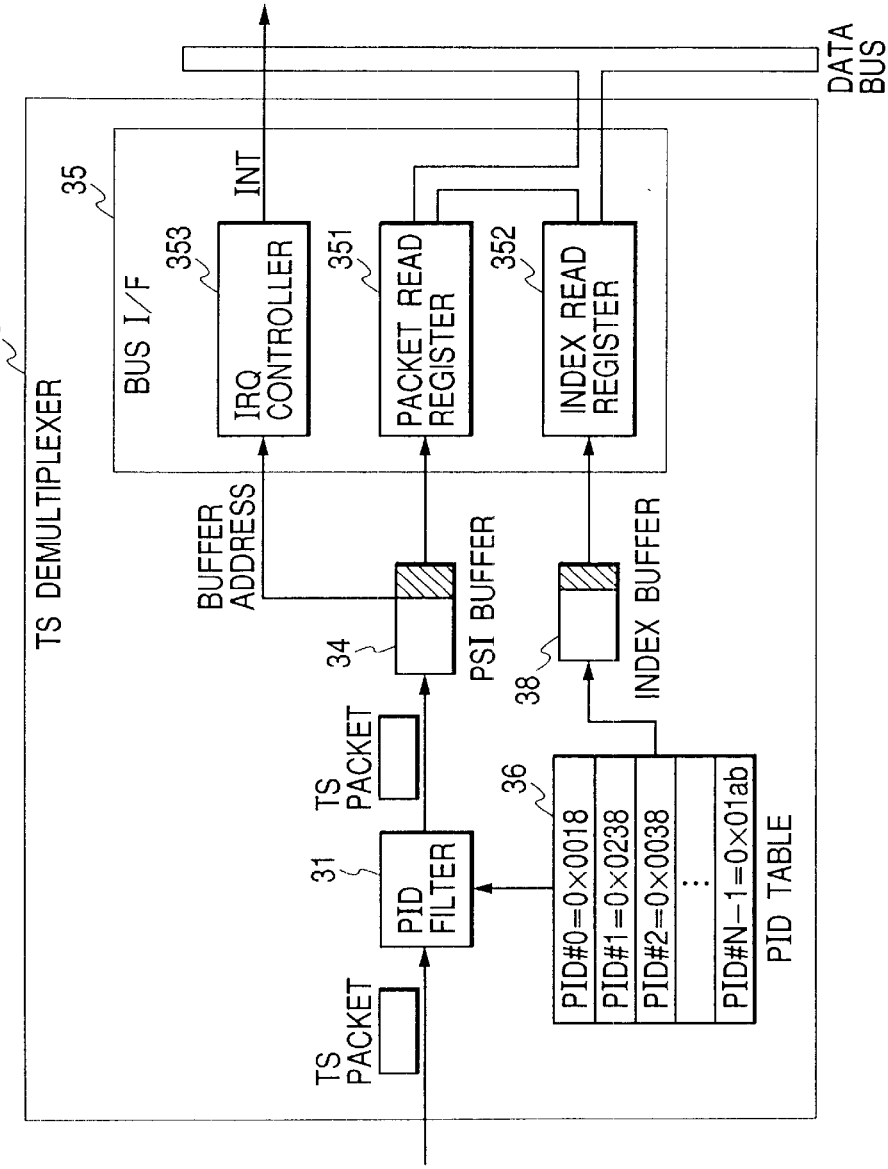
FIG. 7 is a block diagram showing a data transfer route from a PID filter to a bus I/F in a transport demultiplexer according to the second embodiment of the demultiplexing and decoding apparatus for coded audio and video data of the present invention.

FIG. 7 is a block diagram showing the transfer route from the PID filter 31 to the bus I/F 35 in the transport demultiplexer 3 in the second embodiment. Numeral 351 denotes a packet read register; 352, an index read register; 353, an IRQ controller; and 38, an index buffer. In FIG. 7, the elements corresponding to those in FIG. 1 have the same reference numerals.

In FIG. 7, in the transport demultiplexer 3, a PID in the PID table 36 corresponding to the PID of a supplied TS packet is detected. For example, if the PID of the supplied TS packet coincides with a PID #2=0x0038 designated as a PID to be transferred to the CPU 6, the TS packet is transferred to the PSI buffer 34. At this time, the index number "#2" in the PID table 36 is transferred to the index buffer 38. The index buffer 38 comprises an FIFO memory. While the TS packet data is transferred from the PSI buffer 34 via the packet read register 351, the index number "#2" corresponding to the PID of the TS packet being transferred is transferred to the index read register 352 and held there.

The IRQ controller 353 monitors the buffer address of the PSI buffer 34, and when the data for one TS packet has been stored into the PSI buffer 34, the IRQ controller 353 sends a transfer interrupt request to the CPU 6.

Figure 8:
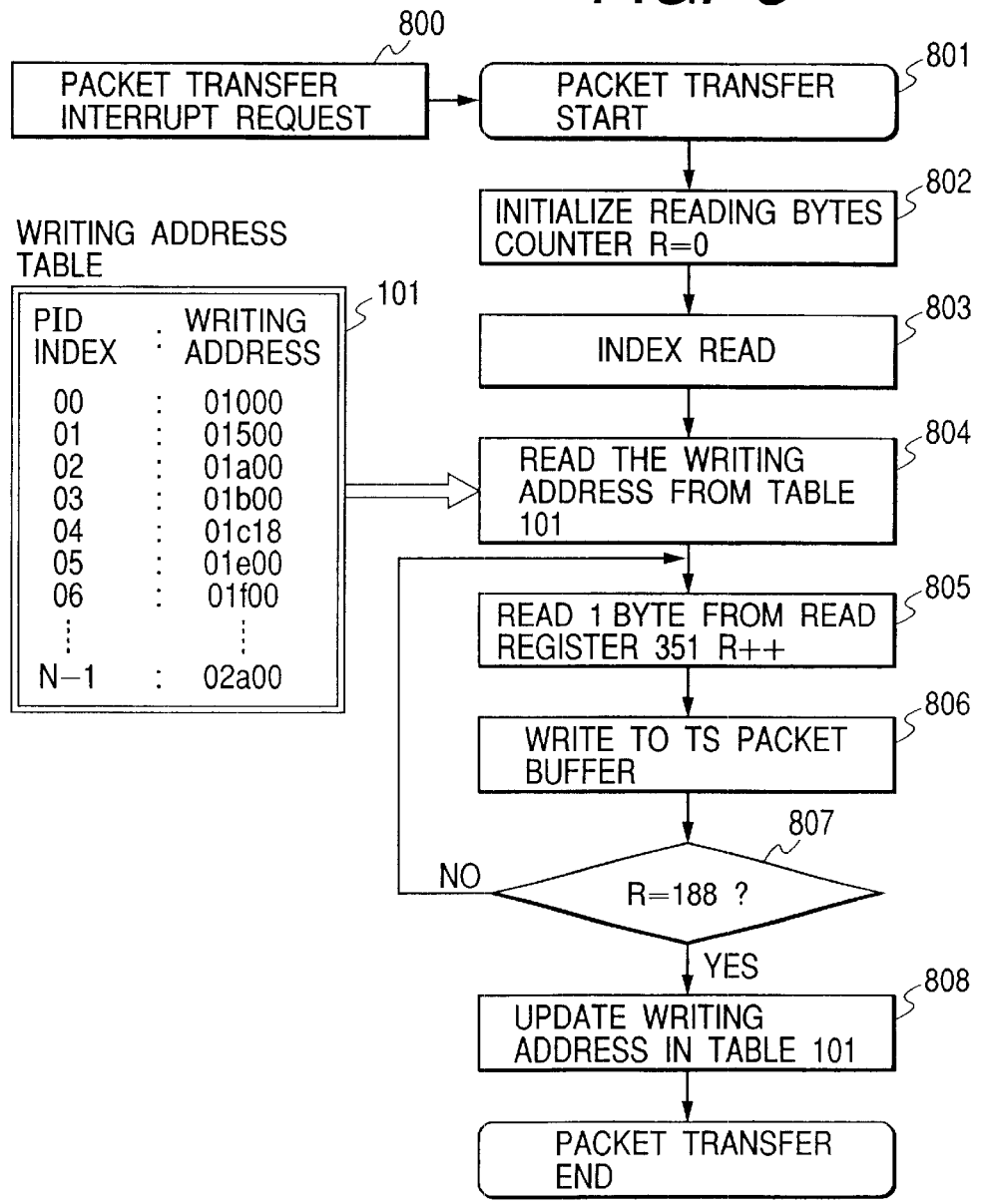
FIG. 8 is a flowchart showing a packet transfer processing procedure from reception of a transfer request, in the second embodiment of the demultiplexing and decoding apparatus for coded audio and video data of the present invention.

FIG. 8 is a flowchart showing the procedure of packet transfer processing upon reception of transfer request according to the second embodiment.

In FIGS. 7 and 8, when the CPU 6 receives a packet transfer interrupt request from the IRQ controller 353 (step 800), the CPU enters the interrupt sequence (step 801) from the normal sequence.

That is, first, the byte count number R of read packet is initialized to "0" (step 802), and an index number "#n" in the PID table 36 is read from the index read register 352 (step 803). The CPU 6 has a writing address table 101 holding writing addresses of the respective TS packet buffers #n in the working area 71 of the RAM 7 (FIG. 1). The CPU 6 performs indirect addressing to the writing address of the TS packet buffer #n (FIG. 6) by the read index number "#n". For example, if an index number "#2" in the PID table 36 is read, a hexadecimal five digit writing address "01a00" from the writing address table 101 (step 804). The writing address indicates an absolute address in the RAM 7. TS packet data is read from the packet read register 351 in 1-byte units (step 805), and sequentially written into the RAM 7 from this writing address (step 806). Then, when data for one TS packet has been written (the count number R of read packet bytes=188) (step 807), 188 bytes are added to the address "01a00" in the writing address table 101, then the next writing address "01abc" is indicated. (step 808). Thereafter, the interrupt sequence ends, and the process returns to the normal operation.

As described above, in the second embodiment, as the processing priority order can be set in PID units, the system control avoiding system failure can be performed.

Further, as the index number in the PID table 36 of a TS packet transferred from the transport demultiplexer 3 is sent to the CPU 6, the CPU 6 does not compares values of N PID's but merely refers to the writing address table 101, and determines a writing address of the TS packet buffer #n.

Generally, as the CPU 6 issues only several steps of instructions at one table reference, the amount of processing is less than several tens steps of processing in comparison of N PID's. It is preferable that the CPU 6 has response as quick as possible to interrupt requests from the user I/F 10 (FIG. 1) and the like as well as the TS packet transfer. If interrupt sequences with high priority are continuously made, other interrupt sequence is suspended and the entire system response becomes slower. However, as described in the second embodiment, the response characteristic to other interrupt requests can be greatly improved by reducing the amount of TS packet transfer processing.

Figure 9:
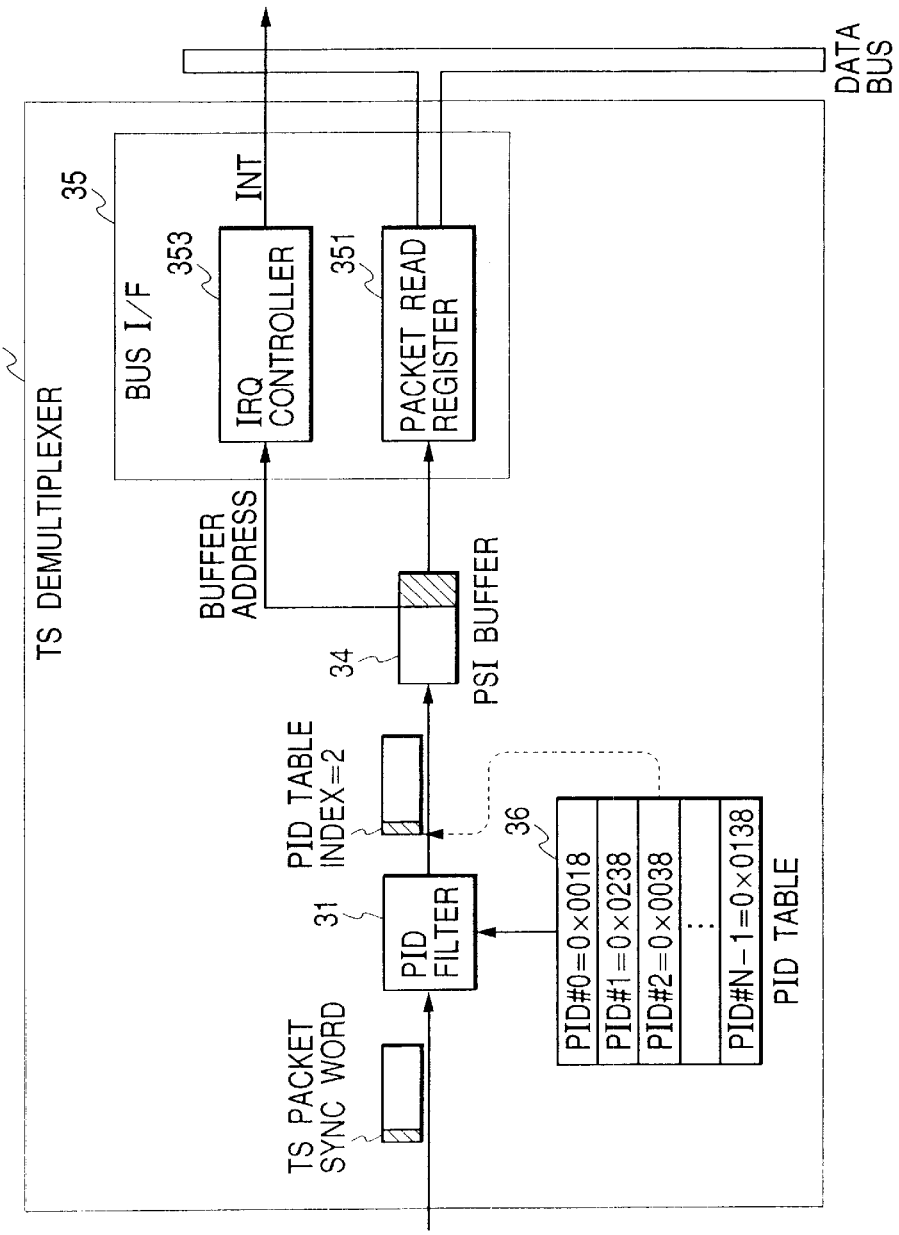
FIG. 9 is a block diagram showing a data transfer route from a PID table in the transport demultiplexer to the CPU according to a third embodiment of the demultiplexing and decoding for coded audio and video data of the present invention.

FIG. 9 is a block diagram showing a data transfer route from the PID table 36 in the transport demultiplexer 3 to the CPU 6 in a third embodiment of the present invention, in which elements corresponding to those in FIG. 7 have the same reference numerals.

The third embodiment have the constituents identical to those in the second embodiment except that the means for notifying the index in the PID table 36 to the CPU 6 is different.

That is, in FIG. 9, regarding a TS packet supplied to the PID filter 31, it is determined whether the PID of the TS packet coincides with one of the PID's set in the PID table 36. In this embodiment, the number N of the PID's set in the PID table 36 is less than 256, and an index number is represented by one byte.

In a case where the PID of the TS packet supplied to the PID filter 31 coincides with a PID in the PID table 36, the sync word (FIG. 11(*a*)) as the head byte of the TS packet is changed to the index number "#n" of the corresponding PID in the PID table 36, and the TS packet is transferred from the PID filter 31 to the PSI buffer 34. The IRQ controller 353 monitors the storage amount of the PSI buffer 34, and when data for one TS packet has been stored into the PSI buffer 34, the IRQ controller 353 sends a TS-packet transfer interrupt request to the CPU 6. The CPU 6 performs the interrupt sequence in response to the request, and reads the data via the packet read register 351 in the bus I/F 35.

In a TS packet defined by the MPEG system, the 1-byte sync word as the head byte is fixedly hexadecimal "47", and is used in sync detection upon TS packet reception. Accordingly, in a data path where the boundary between the sync detection word and the 188 bytes of TS packet is managed, even if the sync word is changed to the index number in the PID table 36, the processing for TS packet interpretation is not influenced.

FIG. 10 is a flowchart showing the procedure of packet transfer processing from reception of a transfer request according to the third embodiment.

In FIG. 10, the CPU 6 receives a packet transfer interrupt request from the IRQ controller 353 (step 1000), and enters the interrupt sequence from the normal sequence (step 1001).

First, the count number R of read packet bytes is initialized to "0" (step 1002), and data for the head one byte of the TS packet is read from the packet read register 351 (step 1003). The read data for one byte indicates the index number "#n" from the PID table 36. The writing address table 101 is referred to with this index number, and the address of writing position of the TS packet buffer #n in the RAM 7 is read (step 1004). The one byte data read at step 1003 is written in this address of the TS packet buffer #n (step 1005). Then, the remaining 187 byte data of the TS packet is sequentially written, in 1-byte units, following the one byte data (steps 1006 and 1007). When the count number R becomes "188" (step 1008), the writing of the data of the TS packet has been completed. Then, 188 bytes are added to the address corresponding to the PID #n in the writing address table 101, and the next writing position is indicated (step 1009). Thereafter, the interrupt sequence ends, and the process returns to the normal sequence.

As described above, in addition to the advantages of the first and second embodiments, in the third embodiment, as an index number in the PID table 36 is written into the actual 188 byte data, the index buffer 38 and the index read register 352 as in the second embodiment are omitted. This further reduces the circuit scale.

As described above, according to the present invention, when data is extracted from a transmitted multiplexed transport stream and interpretation/processing is performed on packet multiplexing information and additional information, a packet having higher priority over other packets can be easily processed prior to the other packets. Further, as the processing priority order can be set by each PID with a simple circuit construction, the load on the interrupt sequence by the CPU can be reduced.

As many apparently widely different embodiments of the present invention can be made without departing from the spirit and scope thereof, it is to be understood that the invention is not limited to the specific embodiments thereof except as defined in the appended claims.

What is claimed is:

1. A demultiplexing and decoding apparatus for coded audio and video data comprising:

a demultiplexer which selects a packet including one set of compressed bitstream from a multiplexed stream formed by packetizing a plurality of compressed bitstreams, each comprising coded video data and coded audio data, and packet multiplexing information and additional information, and further, selects a packet including a part or all of said packet multiplexing information and said additional information;

a video decoder which decodes video data from the selected compressed bitstream;

an audio decoder which decodes audio data from the selected compressed bitstream;

a CPU which interprets said selected packet multiplexing information and controls said video decoder, said audio decoder and said demultiplexer;

a program memory for storing a program in which a procedure by the CPU is described;

a packet buffer for temporarily storing said packet including said selected packet multiplexing information and said additional information until said packet is processed by said CPU; and means for storing said packet into pre-divided packet buffer, plural data segment storage areas, for which priority is set, in accordance with types of data included in said packet, when said packet is stored into said packet buffer memory, and for processing packets stored in said data segment storage areas in accordance with the priority;

wherein said demultiplexer has a PID table holding said PID's of said packets to be selected, and wherein an index number indicative of an element in said PID table is allotted to each PID in said PID table, further wherein said apparatus further comprises means for transferring a packet having a PID corresponding to one of said PID's in said PID table to said packet buffer, and transferring the index number of said PID corresponding to said PIT of said packet to said CPU upon transfer of said packet.

2. The demultiplexing and decoding apparatus for coded audio and video data according to claim 1, wherein said demultiplexer changes a sync word at the head of a packet having a PID corresponding to said PID in said PID table to the index number of said PID, and transferring said packet to said packet buffer.

3. The demultiplexing and decoding apparatus for coded audio and video data according to claim 1, further comprising:

an address table where writing addresses of said packet buffer are described for said PID's; and means for referring to said writing addresses of said address table by using said index number when writing said packet transferred from said demultiplexer into said packet buffer.

4. The demultiplexing and decoding apparatus for coded audio and video data according to claim 2, further comprising:

an address table where writing addresses of said packet buffer are described for said PID's; and means for referring to said writing addresses of said address table by using said index number when writing said packet transferred from said demultiplexer into said packet buffer.

\* \* \* \* \*